United States Patent Office 2,934,539
Patented Apr. 26, 1960

2,934,539

1-[6-METHYL NICOTINOYL]-2-LOWER ALKYL HYDRAZINE

Hugo Gutmann, Birsfelden, Otto Straub, Bottmingen, and Paul Zeller, Neuallschwil, Switzerland, assignors to Hoffmann-La Roche Inc., Nutley, N.J., a corporation of New Jersey No Drawing. Application April 3, 1958
Serial No. 726,059

Claims priority, application Switzerland April 9, 1957

3 Claims. (Cl. 260—295.5)

This invention relaes to nicotinic acid hydrazides. More particularly, the invention relates to nicotinic acid hydrazides which are represented by the following structural formula:

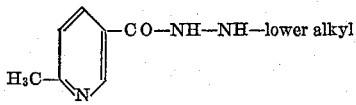

and to acid addition salts of such compounds. Representative of the lower alkyl groups referred to in the above formula are methyl, ethyl, propyl, isopropyl, butyl, isobutyl, amyl, etc.

The compounds of the invention represented by the formula above may be produced by reacting 6-methylnicotinic acid hydrazide with an aldehyde or ketone such as acetaldehyde, propionaldehyde, butyraldehyde, acetone, etc., and hydrogenating the hydrazone, i.e. 1-(6-methylnicotinoyl)-2-lower alkylidene hydrazine, obtained as the reaction product, e.g. catalytically in the presence of platinum oxide. The starting material, 6-methylnicotinic acid hydrazide may be obtained, for example, by reacting 6-methylnicotinic acid ethyl ester with hydrazine hydrate in ethanolic solution.

The compounds represented by the structural formula set forth above form acid addition salts with organic and inorganic acids and these salts are also within the scope of this invention. The salts are produced by reacting the free base, produced as described above, with approximately an equimolecular proportion of the appropriate acid and separating the salt, e.g. by extracting, precipitating, filtering, etc., from the reaction mixture. Representative salts formed by the bases of this invention include hydrohalides, such as the hydrochloride, hydrobromide, etc., nitrate, phosphate, sulfate, oxalate, mandelate, citrate, ascorbate, acetate, etc.

The compounds of this invention are amine oxidase inhibitors, that is, they inhibit the activity of amine oxidase which effects the deactivation of physiological regulators such as serotonin, tryptamine, epinephrine, etc. and stimulate the central nervous system. They are particularly useful for relief of disturbed or depressed states in psychotherapy. The free base or a pharmaceutically acceptable acid addition salt thereof may be administered orally or parenterally in conventional solid or liquid dosage forms such as tablets, capsules, injectables, etc., comprising therapeutic doses incorporated in a conventional solid or liquid vehicle either with or without excipients.

The following example is illustrative of the invention.

Example 15 g. of 6-methylnicotinic acid hydrazide were heated with 250 cc. of acetone for three hours. The reaction mixture was then evaporated to dryness under vacuum and the residue, 1-(6-methylnicotinoyl)-2-isopropylidene hydrazine, was crystallized from benzene.

15 g. of 1-(6-methylnicotinoyl)-2-isopropylidene hydrazine were dissolved in 300 cc. of ethanol and hydrogenated in the presence of platinum oxide catalyst until the calculated amount of hydrogen was absorbed. The catalyst was separated by filtration under suction and the filtrate was evaporated to dryness under vacuum. The residue was crystallized several times from petroleum ether-ethanol. The 1-(6-methylnicotinoyl)-2-isopropyl hydrazine melted at 117–118.5° C.

We claim:

1. A compound selected from the group consisting of bases represented by the formula

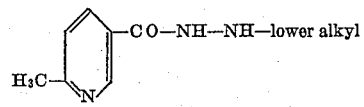

and pharmaceutically acceptable acid addition salts thereof.

2. A compound represented by the formula

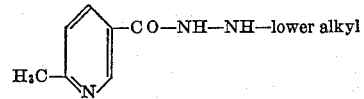

3. 1-(6-methylnicotinoyl)-2-isopropyl hydrazine.

References Cited in the file of this patent

UNITED STATES PATENTS 2,767,192     Offe et al. _____ Oct. 16, 1956

FOREIGN PATENTS 737,758     Great Britain _____ Sept. 28, 1955

OTHER REFERENCES

Yale et al.: J. Am. Chem. Soc., vol. 75, pp. 1933–41 (1953).

Graf: J. Prakt. Chem., vol. 133, pp. 21–24 (1932).